United States Patent
Orr et al.

(10) Patent No.: US 9,350,659 B1
(45) Date of Patent: *May 24, 2016

(54) CONGESTION AVOIDANCE FOR NETWORK TRAFFIC

(71) Applicant: MARVELL INTERNATIONAL LTD., Hamilton (BM)

(72) Inventors: Michael Orr, Sunnyvale, CA (US); Gad Hutt, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 449 days.

This patent is subject to a terminal disclaimer.

(21) Appl. No.: 13/852,592

(22) Filed: Mar. 28, 2013

Related U.S. Application Data

(63) Continuation of application No. 12/792,082, filed on Jun. 2, 2010, now Pat. No. 8,411,694.

(60) Provisional application No. 61/220,694, filed on Jun. 26, 2009.

(51) Int. Cl.
*H04L 12/28* (2006.01)
*H04L 12/801* (2013.01)
*H04J 1/16* (2006.01)

(52) U.S. Cl.
CPC .................................... *H04L 47/12* (2013.01)

(58) Field of Classification Search
USPC .......................................... 370/252, 230, 412
See application file for complete search history.

(56) References Cited

U.S. PATENT DOCUMENTS

| | | | |
|---|---|---|---|
| 6,996,062 B1 | 2/2006 | Freed et al. | |
| 7,660,321 B2 | 2/2010 | Cortes et al. | |
| 8,144,588 B1 * | 3/2012 | Ma | H04L 49/90 370/235 |
| 2002/0181484 A1 | 12/2002 | Aimoto | |
| 2003/0112814 A1 | 6/2003 | Modali et al. | |
| 2006/0002396 A1 | 1/2006 | Amagai et al. | |
| 2007/0280111 A1 | 12/2007 | Lund | |
| 2008/0291829 A1 * | 11/2008 | Hammar | 370/235 |
| 2009/0080451 A1 * | 3/2009 | Gogic | H04L 12/5695 370/412 |
| 2010/0027425 A1 | 2/2010 | Cheung et al. | |

OTHER PUBLICATIONS

Wikipedia, "Network Congestion Avoidance" from http://en.wikipedia.org/wiki/Network_congestion_avoidance, printed on Feb. 3, 2010 (3 pgs).

Wikipedia, "Random Early Detection" from http://en.wikipedia.org/wiki/Random_early_drop, printed on Feb. 3, 2010 (1 pg).

* cited by examiner

*Primary Examiner* — John Pezzlo

(57) ABSTRACT

In one embodiment, an apparatus comprises a queue scheduler configured to schedule frames to be buffered through one of a plurality of queues wherein each queue is designated to buffer frames having a pre-assigned priority. Congestion control logic is configured to change the pre-assigned priority of one or more frames before the one or more frames are scheduled by the queue scheduler to cause the one or more frames to be buffered in a different queue than the queue designated for the pre-assigned priority.

19 Claims, 4 Drawing Sheets

CONGESTION AVOIDANCE FOR NETWORK TRAFFIC

CROSS REFERENCE TO RELATED APPLICATIONS

This disclosure is a continuation of U.S. application Ser. No. 12/792,082 filed on Jun. 2, 2010 now U.S. Pat. No. 8,411,694, which claims benefit under 35 USC §119(e) to U.S. provisional application Ser. No. 61/220,694 filed on Jun. 26, 2009, which are both incorporated herein by reference in their entirety.

BACKGROUND

The use of communication networks such as the Internet has become widespread. To perform data communication over a network, various protocols can be used. The Transmission Control Protocol (TCP) along with the Internet Protocol (IP) are the core protocols of the Internet Protocol Suite. The Internet Protocol handles lower-level transmissions from router to router as a message makes its way across the Internet. TCP operates at a higher level and operates with end systems, for example a Web browser and a Web server.

Network resources are limited (e.g. processing time, link throughput, memory, etc.) and network congestion can occur. Various schemes for avoiding network congestion have been tried. Network congestion avoidance in such schemes was implemented by dropping communication session packets as network traffic reached or nearly reached congestion levels. These network congestion avoidance schemes are typically implemented with respect to one or more nodes in the network such as within routers, switches, gateways, and servers.

TCP has a congestion-avoidance feature whereby when a packet/frame is dropped due to congestion, the source of the packet (sending side) reduces its sending rate (e.g. by half) thereby reducing the congestion that is assumed to have cause the packet being dropped. After reducing the sending rate in one large step, TCP allows the source to accelerate its sending rate gradually until the next time a packet is dropped/lost, and so on. When many TCP flows (e.g. senders) pass through a common queue that becomes congested, the queue drops all packets seen in close succession, and in a short period of time, drops packets belonging to many separate TCP flows. Each TCP flow independently reduces its sending rate, but the result is that all the affected TCP senders start the congestion-avoidance at about the same time. Thus they all reduce their sending rate together and cause the congestion to be resolved. But then all TCP flows accelerate together. If conditions are approximately equal for all TCP flows, they all accelerate at the same rate and will again reach the point where the common queue is congested causing all the TCP flows to again lose packets at the same time. This cycle can then repeat. This condition or phenomena is commonly referred to as "global TCP loss synchronization." This condition may be harmful in terms of under-utilization of an available link bandwidth and in terms of the level of service provided to each TCP connection.

Some techniques have been used to mitigate global TCP loss synchronization. For example, random early detection or drop (RED) operates to prevent network congestion by dropping packets before a networking device's buffer capacity is full. Weighted random early detection or drop (WRED) operates to prevent network congestion by dropping packets similar to RED, but adds weighting in packet dropping decision making to accommodate quality of service applications. However, these techniques require frames to be dropped before they have to be dropped. A different way for mitigating global TCP loss synchronization may be desired.

SUMMARY

In one embodiment, an apparatus comprises a queue scheduler configured to schedule frames to be buffered through one of a plurality of queues wherein each queue is designated to buffer frames having a pre-assigned priority. Congestion control logic is configured to change the pre-assigned priority of one or more frames before the one or more frames are scheduled by the queue scheduler to cause the one or more frames to be buffered in a different queue than the queue designated for the pre-assigned priority.

In another embodiment, a method for a network device comprises receiving network communications from a plurality of network sources, wherein the network communications contain an assigned priority that, at least in part, causes the network communications to be processed through a designated queue. One or more selected network communications are distributed to a different queue than an originally designated queue by changing the assigned priority of the one or more selected network communications before the selected network communication reaches the originally designated queue.

BRIEF DESCRIPTION OF THE DRAWINGS

The accompanying drawings, which are incorporated in and constitute a part of the specification, illustrate various example systems, methods, and other embodiments. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements, or multiple elements may be designed as one element. In some examples, an element shown as an internal component of another element may be implemented as an external component and vice versa. Furthermore, elements may not be drawn to scale.

DETAILED DESCRIPTION

The disclosure describes systems and methods to prevent or reduce the occurrence of TCP global loss synchronization. In one embodiment, instead of dropping frames before a buffer is full, the system changes priorities (e.g. promotes) selected frames causing the frames to be moved to a different priority queue.

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic" refers to a means for implementing a feature or component. Logic may include, but is not limited to, a microprocessor, discrete logic (e.g., ASIC), an analog circuit, a digital circuit, a programmed logic device, a memory device containing instructions, non-transitory computer-readable media, combinations of components, and so on. Logic may include one or more gates, combinations of gates, or other circuit components.

Figure 1:
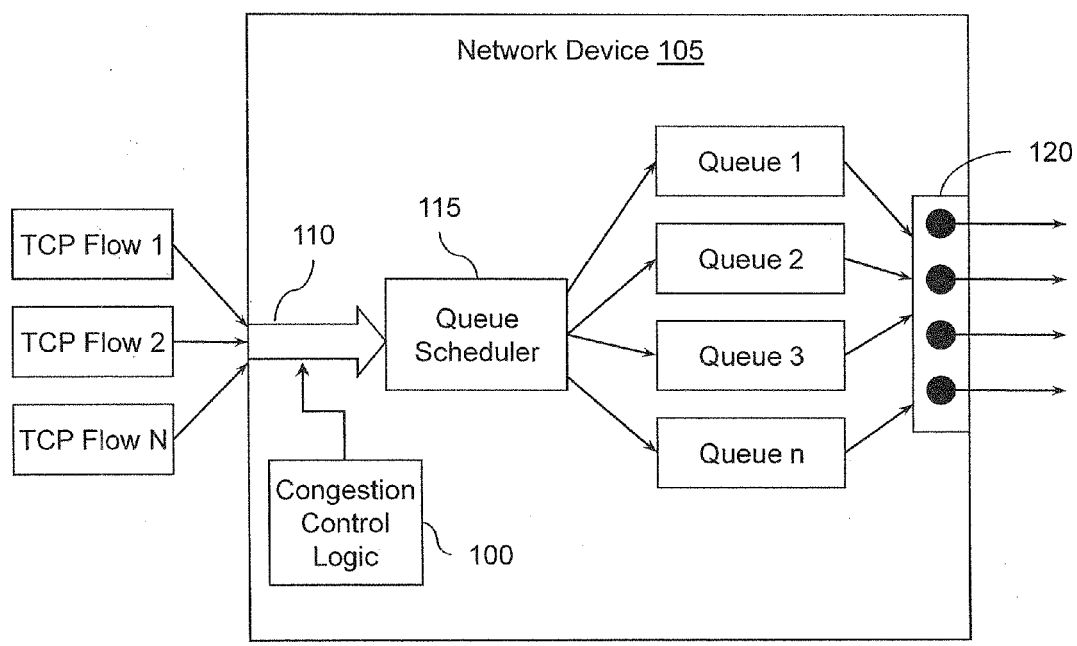
FIG. 1 illustrates an embodiment of a congestion control logic that may be implemented in a network device.

FIG. 1 illustrates one embodiment of congestion control logic 100 for preventing or reducing the occurrence of Transmission Control Protocol (TCP) global loss synchronization among a plurality of TCP flows 1-N. The congestion control logic 100 can be implemented within or added to a network device 105 that processes network traffic (e.g. a router, switch, and so on). Incoming network communications/traffic may be from various sources but the following examples will refer to the sources as different TCP flows 1-N. The incoming traffic may be in the form of frames or packets that are received by the network device 105 and processed through one or more ingress ports and paths 110. A queue scheduler 115 schedules and assigns the incoming frames to appropriate queues 1-n. The queues 1-n buffer the frames until the frames are outputted to egress ports 120 and continue along a designated communication path out from the network device 105 toward their destination. In some embodiments, the queues 1-n are implemented so that two or more queues output to a single egress port 120. In another embodiment, the network device 105 can include both a centralized set of queues that output to several egress ports 120 and queues with single port assignments. Accordingly, two or more instances of the congestion control logic 100 may be implemented (e.g. one for the set of centralized queues, and an instance for each set of single-port queues).

When frames from the TCP flows 1-N are received by the network device 105, the frames include a pre-assigned priority level that is associated with the frame. The priority level may be previously set by a sending device (e.g. the source device of the TCP flow, or previous network device) or is set at a default value. The priority level may represent a traffic class to which the frame belongs. The queues 1-n are configured to buffer frames based on a priority. Each queue 1-n may be designated to process frames associated with a different priority. For example, queue 1 processes frames having the highest priority; queue 2 processes frames having a medium priority; queue 3 processes frames having a best effort priority; and so on. Of course, different representations of priority levels can be implemented. The queue scheduler 115 controls the scheduling and assignments of frames to a queue.

Frames with the same priority level/traffic class that come from different TCP flows are processed though the same queue. At some point, the queue will become full or nearly full, which may result in frames being dropped according to an implemented congestion avoidance mechanism such as random early detection/drop (RED), weighted random early detection/drop (WRED), tail drop (TD), and so on as described previously.

To avoid or at least reduce the number of frames being dropped before the capacity of any one of the queues 1-n is exhausted, in one embodiment the congestion control logic 100 changes the pre-assigned priority of selected frames from the TCP flows 1-N. For example, the congestion control logic 100 selects frames from the ingress path 110 before the frames are scheduled by the queue scheduler 115. The pre-assigned priority within the selected frames is changed to a different priority. Changing the priority causes the frame to be processed through a different queue than it would have been with the original priority (e.g. frame with original pre-assigned priority is processed through queue 3, but after priority change it is processed through queue 2). Thus the path of the frame is changed to be processed through a different resource (e.g. a different queue).

One effect of changing or re-assigning the priority is that frames from different sources (different TCP flows) that originally have the same priority are distributed through different queues instead of being processed through the same shared queue. Thus frames from the different TCP flows will not be simultaneously dropped since the shared queue is filled up more slowly. As such, the potential synchronization of those TCP flows is reduced because all their frames are no longer processed through the same shared queue. Furthermore, the likelihood of global loss synchronization is reduced without having to drop frames while bandwidth is still available (e.g. the associated queue is not yet full).

After the frames are in their associated queue or newly assigned queue, different scheduling mechanisms may be applied for accessing the egress port(s) 120. For example, weighted round-robin (WRR) scheduling can be used to determine the way the queues 1-n share the interface bandwidth to the egress ports 120. Frames from higher priority queues generally get priority to the interface to the egress ports 120 (e.g. communication path(s)).

In one embodiment, the congestion control logic 100 randomly selects the frames to change their priority. For example, one frame or a group of frames from the same source (e.g. from a TCP flow) are selected and their pre-assigned priority is changed. The pre-assigned priority can be increased to a higher priority (e.g. promote the frame to a better priority). The priority can be lowered in some examples.

In another embodiment, the congestion control logic 100 may be implemented as part of the queue scheduler 115. In yet another embodiment, the congestion control logic 100 may be a chip mechanism added to the network device 105 where the chip mechanism moves frames from queue to queue. For example, frames that have already been scheduled and buffered in a queue are selected from the queue and moved/transferred to another queue (e.g. move frames from queue 3 to queue 1). Such a queue re-assignment thus changes the processing priority of the frame since the queues are processed with different priority.

Figure 2:
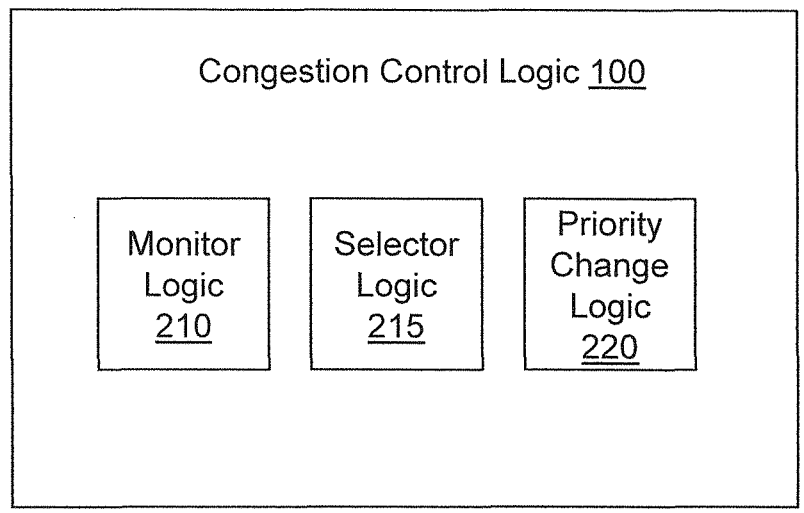
FIG. 2 illustrates another embodiment of the congestion control logic.

With reference to FIG. 2, one embodiment of the congestion control logic 100 from FIG. 1 is shown. The congestion control logic 100 may include monitor logic 210, selector logic 215, and priority change logic 220. Monitor logic 210 is configured to monitor incoming network communications for certain parameters or attributes that are used by the selector logic 215 to select frames. If the selector logic 215 is set to randomly select frames, then the monitor logic 210 retrieves a random frame. The priority change logic 220 identifies the pre-assigned priority associated with the selected frame and changes the pre-assigned priority to a different priority. This may include modifying the priority in the frame, marking the priority with a different value, and so on.

In another embodiment, the selector logic 215 is configured to select a TCP flow (e.g. randomly or not). The monitor logic 210 then monitors incoming frames to identify frames that belong to the selected TCP flow. In one example, the monitor logic 210 identifies a selected TCP flow or TCP session from frame header information that includes a source ID address, destination address, source port, and destination port. Frames having the same source ID address belong to the same source. The priority change logic 220 then changes the priority of a group of frames from the selected TCP flow.

For example, a number of frames (e.g. 5, 10, and so on) are selected from the same source/TCP flow and their priorities are changed. In another example, the selection is performed for a pre-determined time period such that the pre-assigned priorities of all frames from a selected source/TCP flow are changed during the time period. This technique can be regarded as a semi-random selection. In one embodiment, only TCP frames are selected for priority change and other types of frames are ignored.

Figure 3:
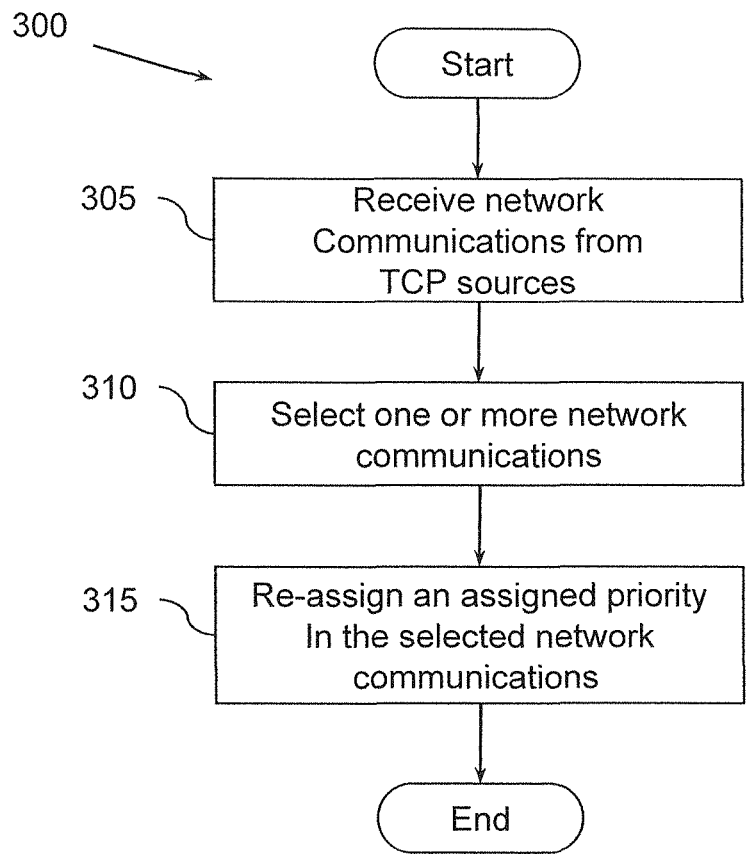
FIG. 3 illustrates an example embodiment of a method associated with congestion avoidance.

With reference to FIG. 3, one embodiment of a method 300 associated with reducing or preventing global TCP loss synchronization in a network device is shown. Method 300 may be implemented and performed in a device similar to the network device 105 of FIG. 1. For explanatory purposes, the following example refers to similar components as in FIG. 1.

At 305, the method may initiate when network communications are received from a plurality of TCP sources. For example, receiving communications includes the scenario where TCP traffic passes through a device (e.g. a network switch), and not necessarily that the switch is the "receiver" of the traffic. The switch "receives" the traffic for handling/processing the traffic by at least performing store-and-forward functions. Thus the traffic is stored momentarily in the buffers of the switch while the traffic is being handled.

The network communications (e.g. frames, packets) contain an assigned priority that, at least in part, causes the network communications to be processed through a designated queue. At 310, one or more network communications are selected. In one example, a group of frames from the same TCP flow can be selected. At 315, the assigned priority from the selected network communications is re-assigned to cause the network communications to be processed through a different queue than the designated queue. As such, the processing path of the frames is changed to travel through different resources within the network device 105.

In another embodiment, the method 300 may include a monitoring stage between 305 and 310. For example, the queues are monitored for congestion. If a congestion threshold is met or exceeded, then the actions of 310 and 315 are invoked. If the congestion threshold is not met, the method may decide to not perform a priority re-assignment and simply let other existing TCP mechanisms work until congestion is detected.

In one embodiment, the priority is changed to a promoted priority, which moves the frame to a higher priority queue. In another embodiment, the priority is a traffic class of a frame and thus the traffic class is changed. Frames may be randomly selected.

As previously explained, once frames are in different queues, the frames are given differential treatment (e.g. by WRR scheduling of their sending rate). The differential treatment may result in breaking potential synchronization between TCP flows without prematurely dropping frames when the queues are not full. This is unlike the prior techniques that drop frames before a queue is full as stated in the background.

Figure 4:
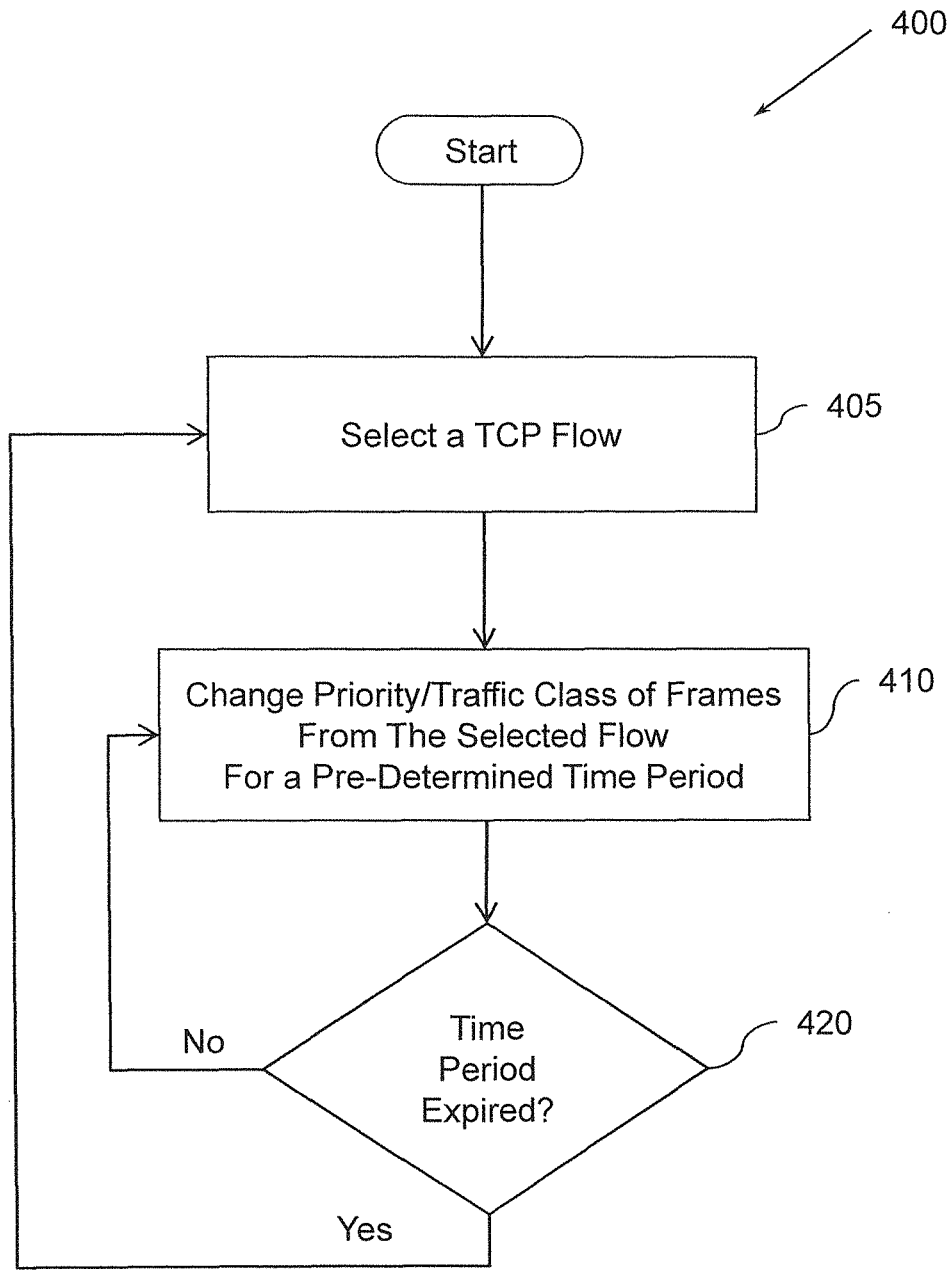
FIG. 4 illustrates another embodiment of a method associated with congestion avoidance.

With reference to FIG. 4, another embodiment is shown of a method 400 associated with selecting frames for congestion avoidance. Under some conditions, it may not be beneficial to only select one frame at a time for priority change. This may cause too many frames from the same TCP flow to be sent out of order. Method 400 selects groups of frames based on their TCP flow.

At 405, a TCP flow/session is selected. The TCP flow may be selected randomly, or selected based on a previously selected TCP flow. At 410, for a pre-determined time period, the method identifies all frames from the selected TCP flow/session and re-assigns the assigned priority of the frames to a different priority. The frames may not be consecutively received by the network device but may be interleaved with frames from other TCP flows. Changing the priority may involve changing the traffic class of the frames as previously explained. At 420, the method checks if the time period has expired. If not, the method continues to identify and change the priority of frames from the selected TCP flow. After the time period expires, the method returns to 405 and a different TCP flow/session is selected. The method then repeats.

In one embodiment, the decision of which frames or which TCP flows to promote and when, may be random. In another embodiment, the system provides a user interface that allows a user to select and decide or at least influence the process (e.g. by allowing, denying, giving priority to selected flows, sources, destinations, applications and so on). The decision and selection may not be random, for example by giving weight to certain frames and then selecting those frames for promotion more often. This may be referred to as Weighted Random Early Promotion (WREP).

To prevent or at least reduce global synchronization, the decision to promote a whole TCP flow may be performed for a relatively short duration (e.g. microseconds, seconds). If a particular network device has sustained congestion and long-duration flows, promoting a subset of the flows to a higher queue may help but the device may experience synchronization between each of the two classes of flows—the promoted flows as one synchronized group, and the un-promoted flows as a separate synchronized group. To reduce this condition, the congestion control logic 100 may randomly "un-promote" previously promoted TCP flows, and promote other TCP flows.

In another embodiment, a frequency of the promotion-decision cycle may be programmable. In one example, the frequency may be set to about 50%-75% of the average time for a full acceleration cycle of TCP. This can be estimated from the communication path attributes (e.g. bandwidth, round trip time, and so on).

While example systems and methods have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus comprising:
a queue scheduler, implemented in at least hardware, configured to schedule frames to be buffered through one of a plurality of queues wherein each queue is designated to buffer frames having a pre-assigned priority; and
congestion control logic, implemented in at least hardware, configured to (1) select a network session from a plurality of network sessions from which network frames are received, and (2) change the pre-assigned priority of one or more frames from the received network frames before the one or more frames are scheduled by the queue scheduler to cause the one or more frames to be buffered in a different queue than the queue designated for the pre-assigned priority.

2. The apparatus of claim 1, wherein the congestion control logic is configured to (i) randomly select the one or more frames from the plurality of network sessions and (ii) increase the pre-assigned priority of the one or more frames,
wherein the queue scheduler is configured to schedule each of the frames, including the one or more frames, to designated queues of the plurality of queues based at least in part on the pre-assigned priority associated with the frame.

3. The apparatus of claim 1, wherein each queue is designated to process frames associated with a different priority.

4. The apparatus of claim 1, wherein the congestion control logic is configured to select the network session and change the pre-assigned priority of frames received from the selected network session for a pre-determined time period.

5. The apparatus of claim 1 further comprising:
one or more egress ports; and
where two or more queues of the plurality of queues are configured to output frames to a single egress port.

6. A device, comprising:
a plurality of queues, implemented with at least one memory, wherein each queue is configured to process network communications associated with a different priority, and wherein the network communications each have a pre-assigned priority that, at least in part, is used to determine which queue the network communication will be processed in; and
congestion control logic, implemented with at least hardware, configured to randomly change the pre-assigned priority of one or more selected frames from the network communications to cause the selected frames to be processed through a different queue in the plurality of queues to reduce global Transmission Control Protocol (TCP) loss synchronization among a plurality of network connections from which the network communications are received.

7. The device of claim 6, comprising a queue scheduler configured to schedule the frames from the network communications to the plurality of queues based at least in part on the pre-assigned priority associated with the frame.

8. The device of claim 7, wherein the congestion control logic is configured to change the pre-assigned priority of the one or more selected frames prior to the selected frames being scheduled by the queue scheduler.

9. The device of claim 6, wherein the device includes a plurality of ingress ports configured to receive the network communications from a plurality of sources.

10. The device of claim 6, wherein the congestion control logic is configured to identify and select Transmission Control Protocol (TCP) frames from the network communications.

11. The device of claim 6, wherein congestion control logic is configured to change the pre-assigned priority of the selected frames by transferring the selected frames from one queue to another queue within the plurality of queues.

12. The device of claim 6 wherein the congestion control logic includes monitor logic configured to (i) monitor the network communications along an ingress path and (ii) identify a selected frame.

13. A device comprising:
a plurality of queues, implemented with at least one memory, wherein each queue is configured to process network communications associated with a different priority, and wherein the network communications each have a pre-assigned priority that, at least in part, is used to determine which queue the network communication will be processed in; and
congestion control logic, implemented with at least hardware, configured to randomly change the pre-assigned priority of one or more selected frames from the network communications to cause the selected frames to be processed through a different queue in the plurality of queues;
wherein:
the device is configured to receive the network communications from a plurality of network connections; and
the congestion control logic is configured to
randomly select one network connection from the plurality of network connections, and
change the pre-assigned priority in frames from the one network connection during a pre-determined time period.

14. A method for a network device, the method comprising:
receiving network communications, by the network device, from a plurality of network sources, wherein the network communications contain an assigned priority that, at least in part, causes the network communications to be processed through a designated queue; and
distributing, by at least hardware of the network device, one or more selected network communications to a different queue than an originally designated queue by changing the assigned priority of the one or more selected network communications before the selected network communication reaches the originally designated queue;
wherein network frames are selected as the one or more selected network communications, and wherein changing the assigned priority changes the assigned priority of the network frames to a higher priority to prevent global TCP loss synchronization among a plurality of TCP flows.

15. The method of claim 14, wherein changing the assigned priority comprises changing a traffic class assigned to the network communications.

16. The method of claim 14, wherein changing the assigned priority comprises changing the assigned priority to a higher priority.

17. The method of claim 14, wherein the network frames are selected by randomly selecting one or more of the network frames.

18. The method of claim 14, further comprising selecting the one or more selected network communications by:
selecting a TCP session from the network sources and, for a pre-determined time period, re-assigning the assigned priority to the network frames of the TCP session to a different priority; and
after the pre-determined time period expires, selecting a different TCP session from the network sources and re-assigning the assigned priority to the network frames of the different TCP session to a different priority.

19. The method of claim 14, further comprising selecting one or more of the network frames by (i) identifying and selecting Transmission Control Protocol (TCP) frames and (ii) re-assigning the assigned priority of the TCP frames.

\* \* \* \* \*